(12) United States Patent
Leeder et al.

(10) Patent No.: US 10,592,865 B2
(45) Date of Patent: Mar. 17, 2020

(54) METHODS, SYSTEMS, AND COMPUTER READABLE MEDIA FOR MANAGING SOCIAL INTERACTION HISTORIES

(75) Inventors: Michael Leeder, Stittsville (CA); Carroll Louise Gray-Preston, Morrisville, NC (US); James Angus McEachern, Stittsville (CA); Richard C. Taylor, Manotick (CA)

(73) Assignee: GENBAND US LLC, Plano, TX (US)

( * ) Notice: Subject to any disclaimer, the term of this patent is extended or adjusted under 35 U.S.C. 154(b) by 710 days.

(21) Appl. No.: 13/204,078

(22) Filed: Aug. 5, 2011

(65) Prior Publication Data

US 2013/0036177 A1 Feb. 7, 2013

(51) Int. Cl.
*G06Q 10/10* (2012.01)
*H04L 12/58* (2006.01)

(52) U.S. Cl.
CPC .......... *G06Q 10/107* (2013.01); *H04L 51/32* (2013.01)

(58) Field of Classification Search
None
See application file for complete search history.

(56) References Cited

U.S. PATENT DOCUMENTS

| | | | | |
|---|---|---|---|---|
| 2004/0054737 | A1* | 3/2004 | Daniell | 709/206 |
| 2005/0125541 | A1* | 6/2005 | Frank et al. | 709/227 |
| 2006/0009243 | A1* | 1/2006 | Dahan | H04L 12/581 |
| | | | | 455/466 |
| 2008/0040370 | A1* | 2/2008 | Bosworth | G06F 17/3089 |
| 2008/0183800 | A1* | 7/2008 | Herzog | H04L 67/1095 |
| | | | | 709/202 |
| 2010/0091967 | A1* | 4/2010 | Costello et al. | 379/201.01 |

* cited by examiner

*Primary Examiner* — Thomas J Dailey
(74) *Attorney, Agent, or Firm* — Fogarty LLP (57) ABSTRACT

According to one aspect, the subject matter described herein includes a method for managing social interaction information. The method includes receiving first social interaction information associated with a user of a first over the top (OTT) service platform. The method also includes receiving second social interaction information associated with the user, the second social interaction information from a communications service platform distinct from the first OTT service platform. The method further includes generating, using the first social interaction information and the second social interaction information, consolidated social interaction information and providing the consolidated social interaction information to the user.

19 Claims, 5 Drawing Sheets

HISTORY VIEW
- CHRONOLOGICAL LIST OF SOCIAL ACTIVITIES
- TELEPHONY AND OTT-RELATED EVENTS
  - (E.G., SOCIAL NETWORKING EVENTS)

CONVERSATION VIEW
- VIEW OF SOCIAL CONVERSATIONS
- VIEW AND CONTINUE ACTIVE CONVERSATIONS

METHODS, SYSTEMS, AND COMPUTER READABLE MEDIA FOR MANAGING SOCIAL INTERACTION HISTORIES

TECHNICAL FIELD

The subject matter described herein relates to managing information. More specifically, the subject matter relates to methods, systems, and computer readable media for managing social interaction histories.

BACKGROUND

Modern telecommunications networks offer users a vast array of options for connecting and interacting with one another. In addition to choices provided by telecommunications providers themselves, users can now utilize a variety of independently developed products and services that run "on top" of the infrastructure maintained by the telecommunications industry. These independently developed products and services are commonly referred to as over-the-top (OTT) services because they are not developed with a specific telecommunications provider's network in mind, but rather are designed to interconnect users via a provider-independent platform.

While the rise of OTT services has provided users with increased flexibility by allowing them to separate the manner in which they interact from their respective telecommunications providers, it has also presented new challenges to the telecommunications providers that maintain the networks over which OTT services run. For example, provider revenue models that charge based on the utilization of provider services (e.g., price per voice minute, price per text message) may be incompatible with OTT service platforms that utilize the provider's infrastructure to provide roughly equivalent services at "no cost" to the consumer (e.g., peer-to-peer voice services, instant messaging).

Despite the challenges presented to network providers by the rise in popularity of OTT services, the paradigm shift also presents telecommunications providers with new opportunities. Like other providers, OTT service providers are subject to the "network effect." As a result, OTT service providers are primarily concerned with expanding their user base and hesitant to develop functionality for interacting with other OTT service providers. Often OTT service providers limit their interoperability to assisting users in switching from a competing platform, i.e., by providing a new user with the option to import contact information from another OTT service platform. Unlike their OTT service provider counterparts, telecommunications providers are ideally situated between their end users and the intersection of these various OTT service platforms. From this vantage point telecommunications providers can distinguish themselves by developing and implementing functionality that leverages information from multiple OTT service platforms.

Accordingly, a need exists for methods, systems, and computer readable media for managing social interaction histories.

SUMMARY

According to one aspect, the subject matter described herein includes a method for managing social interaction information. The method includes receiving first social interaction information associated with a user of a first over the top (OTT) service platform. The method also includes receiving second social interaction information associated with the user, the second social interaction information from a communications service platform distinct from the first OTT service platform. The method further includes generating, using the first social interaction information and the second social interaction information, consolidated social interaction information and providing the consolidated social interaction information to the user.

According to another aspect, the subject matter described herein includes a system for managing social interaction information. The system includes a monitoring module configured to receive first social interaction information associated with a user of a first over the top (OTT) service platform and configured to receive second social interaction information associated with the user, the second social interaction information from a communications service platform distinct from the first OTT service platform. The system further includes a social interaction information consolidation (SIC) module configured to generate, using the first social interaction information and the second social interaction information, consolidated social interaction information and configured to provide the consolidated social interaction information to the user.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware (such as a processor) and/or firmware for implementing features described herein.

BRIEF DESCRIPTION OF THE DRAWINGS

The subject matter described herein will now be explained with reference to the accompanying drawings of which.

DETAILED DESCRIPTION

Methods, systems, and computer readable media for managing social interaction histories are provided. According to one aspect, the present subject matter described herein may correlate and consolidate social interaction information associated with a user. For example, over the top (OTT) service platforms, like Twitter and Facebook, can allow mobile network users to interact with others without placing mobile network calls. Conventional logging functionality (e.g., call logs maintained by user equipment (UE)) is inadequate to monitor or record such social interaction via these OTT service platforms. While some OTT service platforms provide logging features and make available this information (e.g., in a web browser), some OTT service platforms do not provide logging features and/or do not provide access to such information. The present subject matter described herein allows social interaction information to be monitored, correlated, consolidated, and/or provided back to the user.

Advantageously, the present subject matter described herein may extend the basic call/message logging capabilities to incorporate all of a user's social interactions, including traditional telephony communications as well as OTT service-related communications (e.g., social networking messages). By extending logging capabilities across traditional telephony communications and various OTT services, a user's true social network may be identified. For example, social interaction information management functionality described herein may aggregate a user's friend connections and consolidate social interactions across all their communications services, thereby presenting a more accurate view of a user's social network than is possible with the conventional social networking sites.

Further, the present subject matter described herein may generate a data structure for storing information or metadata about social interaction information. For example, an aggregated social graph data structure may be generated by extracting social interaction information from multiple sources (e.g. social networking sites, observed telephony usage, application usage, call logs, etc.), correlating the social interaction information with user identities, resolving user identity conflicts (e.g., using extracted relevant static data, such as user information from user equipment or an OTT service platform), and consolidating the information. The data structure may define and maintain associations between different OTT services (e.g., social networking services and/or other communications services). The data structure may include information or metadata usable for generating a visual representation (e.g., a social graph) of at least a portion of the social interactions of the user. For example, a user may filter portions of their social interaction information based on various factors. These factors may include at least one of a time period, a persona, a location, an occupation, an interest, a communications device, a communications service, a conversation, and frequency of interaction. Using the filtered social interaction information, social graphs having unique characteristics may be provided to the user, such as a temporal-based social graph, a true or consolidated social graph, a persona-based social graph, and conversation-based social graph.

Additionally, the present subject matter described herein may provide a framework for implementing enhanced communications services that span or interact with various OTT service platforms. For example, a social graph showing a conversation between two users via multiple social networking services may be provided to the user. The social graph may be interactive and may be configured for initiating or continuing the conversation across various OTT services. As such, the present subject matter described herein may provide a launch pad for users to perform various social interactions via various OTT services using a common interface.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
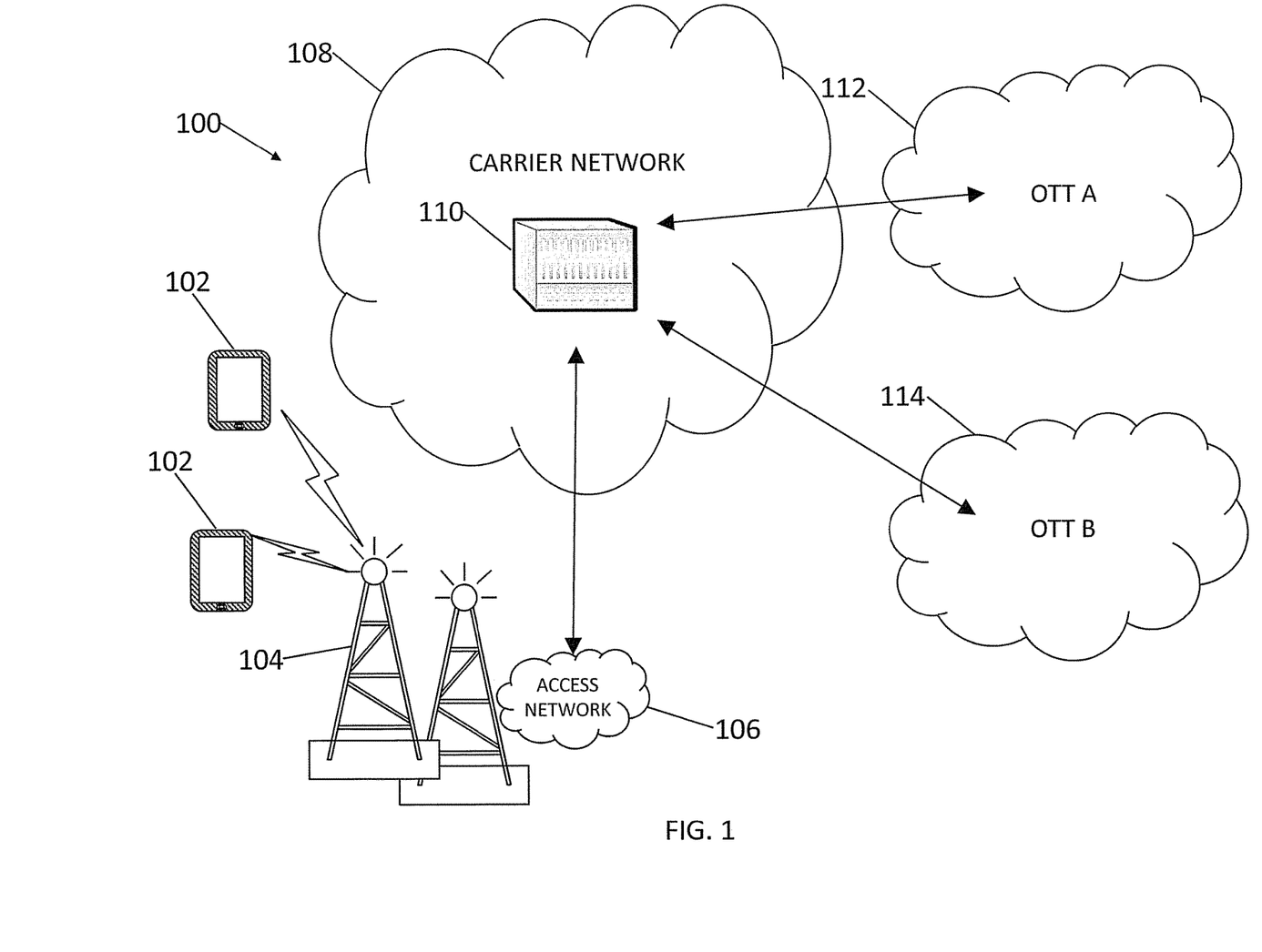
FIG. 1 is a block diagram illustrating an exemplary network for managing social interaction information according to an embodiment of the subject matter described herein.

FIG. 1 is a block diagram illustrating an exemplary network for managing social interaction information according to an embodiment of the subject matter described herein. Referring to FIG. 1, network 100 includes various exemplary components, modules, and/or devices associated with at least one of an access network 106, carrier network 108, and an OTT service platform (e.g., OTT A 112 or OTT B 114). For example, network 100 may include various exemplary components that are involved in content delivery at an access edge, a peering edge, or network aggregation point.

Nodes or elements within the network 100 may communicate various types of traffic, e.g., signaling, management, and user data, using various protocols. Access network 106 represents a network for providing mobile data services to user equipment (UE) 102. For example, access network 106 may include a radio access network. In this example, the radio access network may represent a wireless or radio access portion (e.g., a Universal Mobile Telecommunications System (UMTS), an Evolved Universal Terrestrial Radio Access Network (e-UTRAN), a Code Division Multiple Access (CDMA), an Evolution Data-Only (EV-DO), a Worldwide Interoperability for Microwave Access (Wi-MAX), or a global system for mobile communications (GSM) radio access network (RAN)). In another example, access network 106 may include a fixed broadband network and/or a cable network. Access network 106 may include nodes for sending and receiving communications with other networks or nodes, such as carrier network 108. For example, access network 106 may include a gateway general packet radio service (GPRS) support node (GGSN), a packet data serving node (PDSN), a home agent (HA), a gateway, or a packet data network (PDN) gateway.

UE 102 may represent any device capable of receiving or sending communications (e.g., social interactions) using network 100. For example, UE 102 may include a phone, a computer, a tablet computer, a smartphone, a customer premises equipment (CPE), or other device. Access node (AN) 104 represents a functional entity for receiving and/or sending messages to or from UE 102, e.g., using wireless, cable, xDSL, or fiber technology. For example, UE 102 may communicate with a mobile access network via AN 104. In the example, AN 104 may be a base transceiver station (BTS), a node B, an evolved node B, or an access node.

Carrier network 108 may represent a portion of communications network 100. For example, carrier network may represent a mobile packet core network, such as a GPRS or evolved Packet Core (ePC) network, or other core network, such as an IP Multimedia Subsystem (IMS) network. Carrier network 108 may include one or more social interaction information correlation (SIC) nodes 110 (also referred to as OTT service nodes).

SIC node 110 may represent any entity for monitoring, correlating, and/or consolidating interaction information. For example, SIC node 110 may act as a proxy for communications between UE 102 and an OTT service platform (e.g., OTT A 112). In this example, SIC node 110 may receive social interaction information (e.g., a Facebook friend request) from UE 102. SIC node 110 may store this information in a data structure that represents a user's social interaction history before forwarding the social interaction information to the OTT service platform. In another example, SIC module 110 may be associated with probes or monitoring modules that identify social interaction information and send a copy of the social interaction information to SIC module 110 for processing. For instance, monitoring modules may be located at various nodes or elements in communications network 100, such as an authentication, authorization, and accounting (AAA) server, a dynamic host configuration protocol (DHCP) server, a deep packet inspection (DPI) node, a gateway, a session initiation protocol (SIP) server, a call session control function (CSCF) and/or a Policy and Charging Rules Function (PCRF).

In some embodiments, functionality described herein for managing interaction information may be performed by additional and/or different nodes (e.g., UE 102 or a gateway). For example, UE 102 (e.g., a tablet computer or mobile phone) may include a blended communications application. The blended communications application may include functionality for receiving communications or interaction information. The blended communications application may also include functionality for correlating and/or consolidating the received interaction information into a data structure that represents a user's consolidated interaction history.

OTT A 112 and OTT B 114 represent OTT service platforms. OTT service platforms may include any suitable entities (e.g., servers or other computing platforms) for providing OTT services (e.g., to UE 102). For example, an OTT service platform may be any platform that offers services to users of different telecommunications providers independent of the particular telecommunications provider being utilized. Exemplary OTT service platforms may include a peer-to-peer voice over Internet protocol (VoIP) provider (e.g., Skype), an instant messaging service (e.g., America online instant messenger), an email service (e.g., Google's Gmail), a social networking platform (e.g., Facebook, MySpace, Friendster, Twitter), a really simple syndication (RSS) feed service platform (e.g., an RSS feed provided by a news organization), a social networking service platform, a media hosting service platform, a business networking service platform, or a media streaming service platform.

Some OTT services may be provided, maintained, and/or controlled by entities separate from a communications network provider of an OTT service subscriber. For example, a Verizon wireless subscriber may receive and send communications to a Facebook service platform, e.g., a Facebook server. In this example, communications network 100 is controlled by Verizon Wireless and the OTT service is controlled by Facebook. Other OTT services may be provided, maintained, and/or controlled by a communications network provider of an OTT service subscriber. For example, a Verizon wireless subscriber may receive services associated with a V Cast video on demand service, where communications network 100 and the OTT service are controlled by Verizon Wireless.

Figure 2:
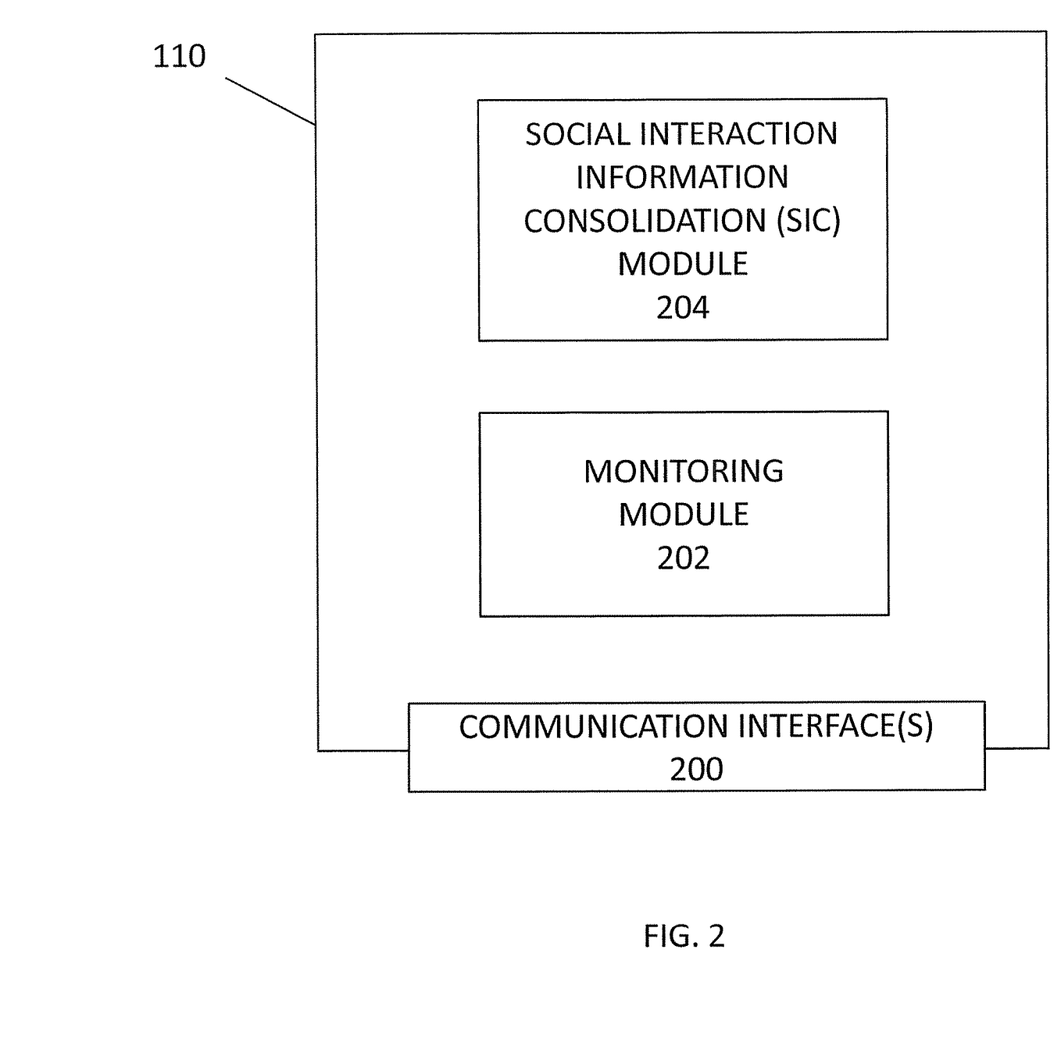
FIG. 2 is a block diagram illustrating an exemplary node for managing social interaction information according to an embodiment of the subject matter described herein.

FIG. 2 is a block diagram illustrating an exemplary node for managing social interaction information according to an embodiment of the subject matter described herein. Referring to FIG. 2, SIC node 110 may include one or more communications interface(s) 200, a monitoring module 202, and a consolidation module 204. Communications interface(s) 200 may be any suitable entity usable for communicating with one or more nodes, networks, and/or OTT service platforms. For example, communications interface(s) 200 may be configured to communicate with various OTT service platforms and communications nodes, e.g., using an extensible messaging and presence protocol (XMPP), extensible markup language (XML), SOAP, hypertext transfer protocol (HTTP), Internet protocol (IP), session initiation protocol (SIP), signaling system number 7 (SS7), or other protocols.

Monitoring module 202 may be any suitable entity (e.g., software executing at a processor) for observing, identifying, copying, and/or logging social interaction information (e.g., as determined by rules and/or triggers). Monitoring module 202 may identify social interaction information associated with various communications services (e.g., OTT services) and may use or provide the information for managing social interaction histories. For example, monitoring module 202 may receive various communications destined for or originating from UE 102. Monitoring module 202 may identify social interaction information and send a copy of the social interaction information to correlation module 204. For example, monitoring module 202 may recognize all new social interactions associated with a user of UE 102 (e.g., phone calls, text messages, tweets, wall posts, friend requests, etc.). Monitoring module 202 may store and/or provide this information, or portions thereof, to consolidation module 204 for processing.

Monitoring module 202 may log, store, and/or provide sufficient information to recreate a user's communication history. Exemplary logged information may include time stamps, friends and associated links, conversation details (e.g., duration, incoming or outgoing details, etc.), pointers to social networks (e.g., hyperlinks associated with relevant interactions), media (e.g., icons or uploaded images), and thread identifiers (e.g., if the event was part of a broader communication). In some embodiments, logged or copied information may be provided to consolidation module 204 periodically or aperiodically (e.g., dynamically).

Consolidation module 204 may be any suitable entity (e.g., software executing at a processor) for receiving, generating, correlating, and/or consolidating social interaction information. For example, consolidation module 204 may receive social interaction information associated with various sources (e.g., Facebook, Twitter, SS7 network, mobile phone network, Google Talk, SIP telephony service, etc.). The information may be received via communications interface(s) 200 and/or received from monitoring module 202. For example, communications interface(s) 200 may be configured to receive XMPP messages from a Google Talk server and other messages from Facebook or Twitter. Communications interface(s) 200 may also be configured to receive SIP, SS7, or other telephony messages from carrier network 108. Consolidation module 204 may correlate the received information (e.g., based on master identities or user information) and generate or update information stored in a data structure that represents social interaction or communication history.

Consolidation module 204 or another module may store user credential information for interacting with one or more communications services. For example, a user may enter login credentials associated with various communications services (e.g. SIP telephony, social networking services, etc.). Consolidation module 204 may store the login credentials and may log-in and/or register with the one or more communications services. Consolidation module 204 may interact with each of these services to retrieve current or past social interaction information. For example, retrieval may be optimized by retrieving only information that has changed (e.g., since the last time social interaction information was retrieved). It will be appreciated that the retrieved information may vary, e.g., depending on the communications service and/or service type. For instance, retrieved information from an OTT IM service may include changes to buddy lists and new messages, whereas retrieved information from Twitter may provide new followers and recent tweets made from other devices.

After receiving social interaction information, consolidation module 204 or another module may correlate and/or merge the information into a data structure usable to provide a social graph or visual representation of social interaction information. Consolidation module 204 may also prune information stored in the data structure. For example, for efficiency and/or storage purposes, consolidation module 204 may remove stale or non-essential social interaction information. Consolidation module 204 and/or another module may also register with various communications services for event notifications. For example, consolidation module 204 may use event notifications for tracking changes that occur in an OTT service platform (e.g., Gmail or Twitter). Information received based on event notifications may be used in keeping information up to date in the data structure.

As stated above, a social graph data structure may be any data structure usable to provide a visual representation of social interaction information. For example, a consolidated social graph may be based on or derived from a data structure that includes a user's complete social interaction history. In this example, the data structure may include social interaction information from all communications services utilized by the user and may maintain associations between the different services. For instance, if the user interacts with others via both Facebook and Twitter (e.g., using different identities), the data structure may include information associating the user's different identities. The data structure may represent these identities (e.g., Facebook and Twitter accounts for the same person) as related segments in the data structure.

In some embodiments, the functionality described herein may be located on a single device or computing platform or may be distributed across multiple devices or computing platforms. For example, monitoring module 202 may be implemented at UE 102 (e.g., an application running on UE 102) or may be implemented within a network-based proxy server. This application may log mobile network calls and messaging service messages (e.g., short messaging service (SMS) or multimedia messaging service (MMS) messages) associated with a user. Monitoring module 202 may also monitor and log OTT service-related information, such as tweets and wall posts, received at or sent from UE 102. Consolidation module 204 or a separate module may generate, using the logged information, consolidated social interaction information and may provide the consolidated social interaction information to the user.

In another example, SIC node 110 may receive social interaction information from a probe or monitoring module 202 located at a second node distinct from SIC node 110. SIC node 110 may include a consolidation module 204 for generating consolidated social interaction information. In yet another example, a proxy server may receive social interaction information communicated between UE 102 and an OTT service platform (e.g., OTT A 112). The proxy server may include functionality (e.g., monitoring module 202 and/or consolidation module 204) for receiving social interaction information and generating, using the received social interaction information, consolidated social interaction information and may provide the consolidated social interaction information to the user. In yet another example, SIC node 110 may be integrated with or co-located at UE 102 or another node.

Figure 3:
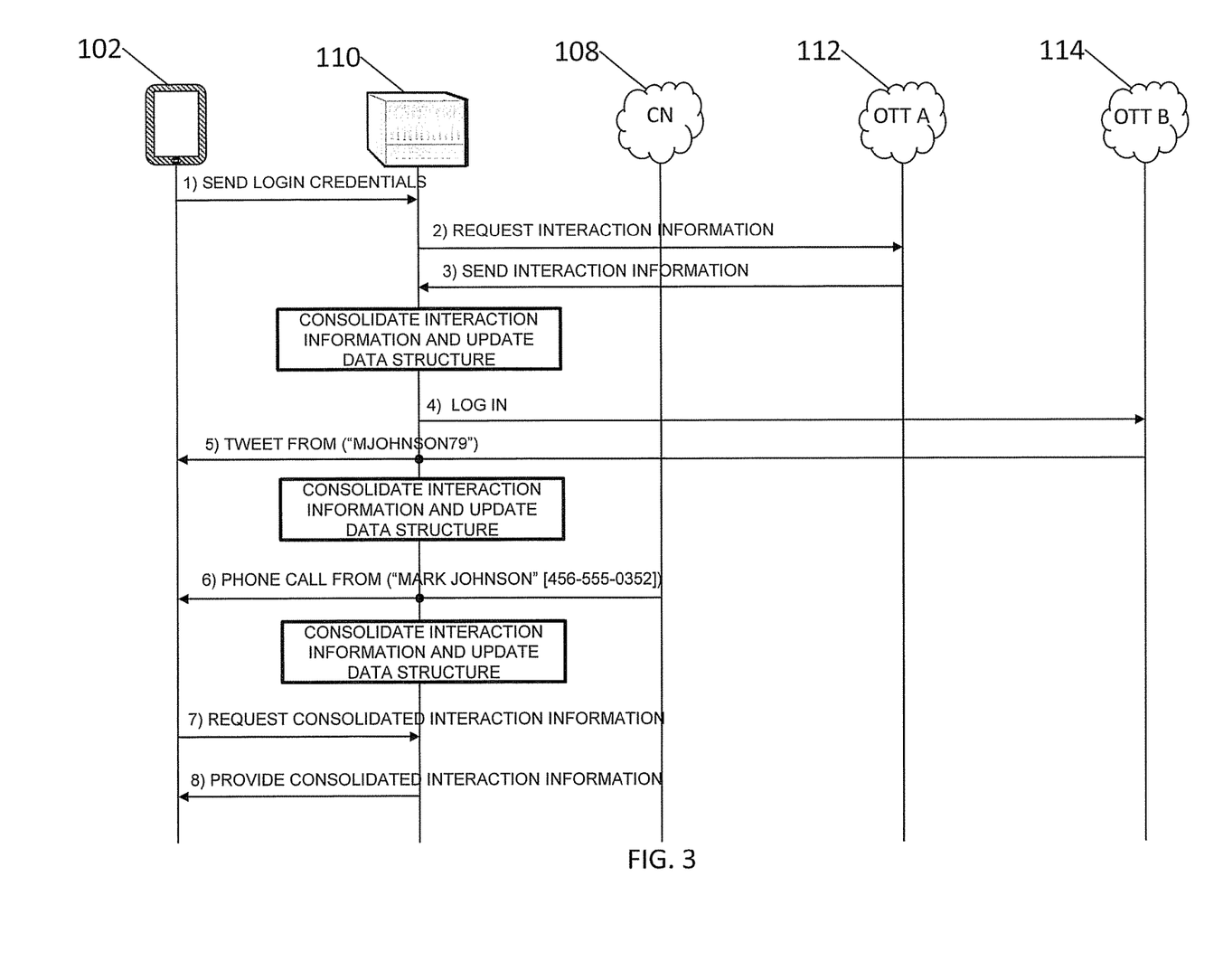
FIG. 3 is a message flow diagram illustrating managing social interaction information according to an embodiment of the subject matter described herein.

FIG. 3 is a message flow diagram illustrating managing social interaction information according to an embodiment of the subject matter described herein. Referring to FIG. 3, a user may enter user information for interacting with various OTT services via UE 102. In step 1, the user information may be sent to SIC node 110. For example, during an initial configuration, a blended communications application running on UE 102 may request credentials from the user for logging in, registering, and/or interacting with Facebook, Twitter, Gmail, and/or other services. After the user has entered such information, the blended communications application may store the credentials and/or provide the credentials to a network-based server (e.g., SIC node 110). In some embodiments, after an initial configuration, the blended communications application may log in into one or more communications services periodically or aperiodically. For example, a blended communications application running on UE 102 may log into all accessible communications services after the device has been powered on or soon thereafter.

In step 2, SIC node 110 may request interaction information from OTT A 112. For example, SIC node 110 may log into OTT A 112 using stored user information and request social interaction information. For instance, SIC node 110 may use an application protocol interface (API) and/or a particular protocol (e.g., SOAP, XML, HTTP, SIP, etc.) for interacting with OTT A 112. In another instance, SIC node 110 may use hypertext transfer protocol messages and/or web interface simulation to glean social interaction information (e.g., from a hypertext markup language (HTML) file associated with OTT A 112).

In step 3, in response to receiving a request for interaction information, OTT A 112 may send interaction information to SIC Node 110. SIC node 110 may receive the interaction information. In an alternate embodiment, OTT A 112 may send interaction information to SIC Node 110 dynamically, periodically, or in response to information being updated. SIC node 110 may consolidate the interaction information and may update previously stored metadata. For example, SIC node 110 may maintain a data structure that stores interaction information and related information of a user (e.g., phone calls, text messages, and social networking events). When new or updated interaction information is received, the information may be processed to resolve identity conflicts and/or to correlate related interactions (e.g., to identify a new interaction associated with a previously identified conversation occurring via multiple communications services). Processing may also include removing stale or excess interaction information. After processing, the data structure may be updated and stored.

In step 4, SIC node 110 may log into OTT B 114. In step 5, OTT B 114 may send interaction information to UE 102. For example, OTT B 114 may represent a Twitter service platform and interaction information may be a Tweet from a user ("MJohnson79"). In this step, SIC Node 110 may receive and store information related to this event. For instance, SIC node 110 may act as a proxy server for phone calls or other interaction events (e.g., Tweets) traversing CN 108. Acting as a proxy server, SIC node 110 may identify phone calls or other interaction events destined to or originating from UE 102. In another instance, relevant interaction information may be forwarded by a second node (e.g., a link probe) to SIC node 110. After receiving the interaction information associated with CN 108, SIC node 110 may consolidate the interaction information and may update stored information in the data structure that represents a user's interaction history. For instance, before updating the data structure, the Tweet sender's identity may be determined to be Mark Johnson (e.g., based on address book information stored at UE 102 or SIC node 110). After determining the sender's identity, information in the data structure associated with Mark Johnson may be updated to include this event.

In step 6, a phone call and/or related signaling (e.g., a SIP Invite or SS7 initial address message (IAM)) may be sent to UE 102). In this step, SIC Node 110 may receive and store information related to this event. After receiving the interaction information associated with CN 108, SIC node 110 may consolidate the interaction information and may update stored information in the data structure that represents a user's interaction history. For example, as shown in FIG. 3, a data structure representing a social interaction or communications history may be updated to include information regarding an incoming phone call from "Mark Johnson."

In step 7, consolidated interaction information may be requested. For example, a user may request their communications history, or a portion thereof, via an application or GUI running on UE 102. In this example, the user may select filter conditions, manipulate GUI elements, or otherwise enter information for requesting particular interaction information (e.g., requesting a temporal-based social graph).

In step 8, consolidated interaction information may be provided to UE 102. For example, in response to receiving a request for consolidated interaction history from an application or GUI running on UE 102, SIC node 110 may generate a social graph (e.g., an interactive visual representation of social interactions) derived from stored interaction information (e.g., stored in a data structure that represents a user's interaction history). In this example, the social graph may be displayed by the application or GUI running on UE 102.

While FIG. 3 describes an exemplary set of messages for an embodiment involving SIC node 110, it will be appreciated that additional and/or different messages may be used to receive, consolidate, and/or display interaction information. Further, in some embodiments, functionality of SIC node 110 may be performed by additional and/or different nodes (e.g., UE 102 or a gateway).

Figure 4:
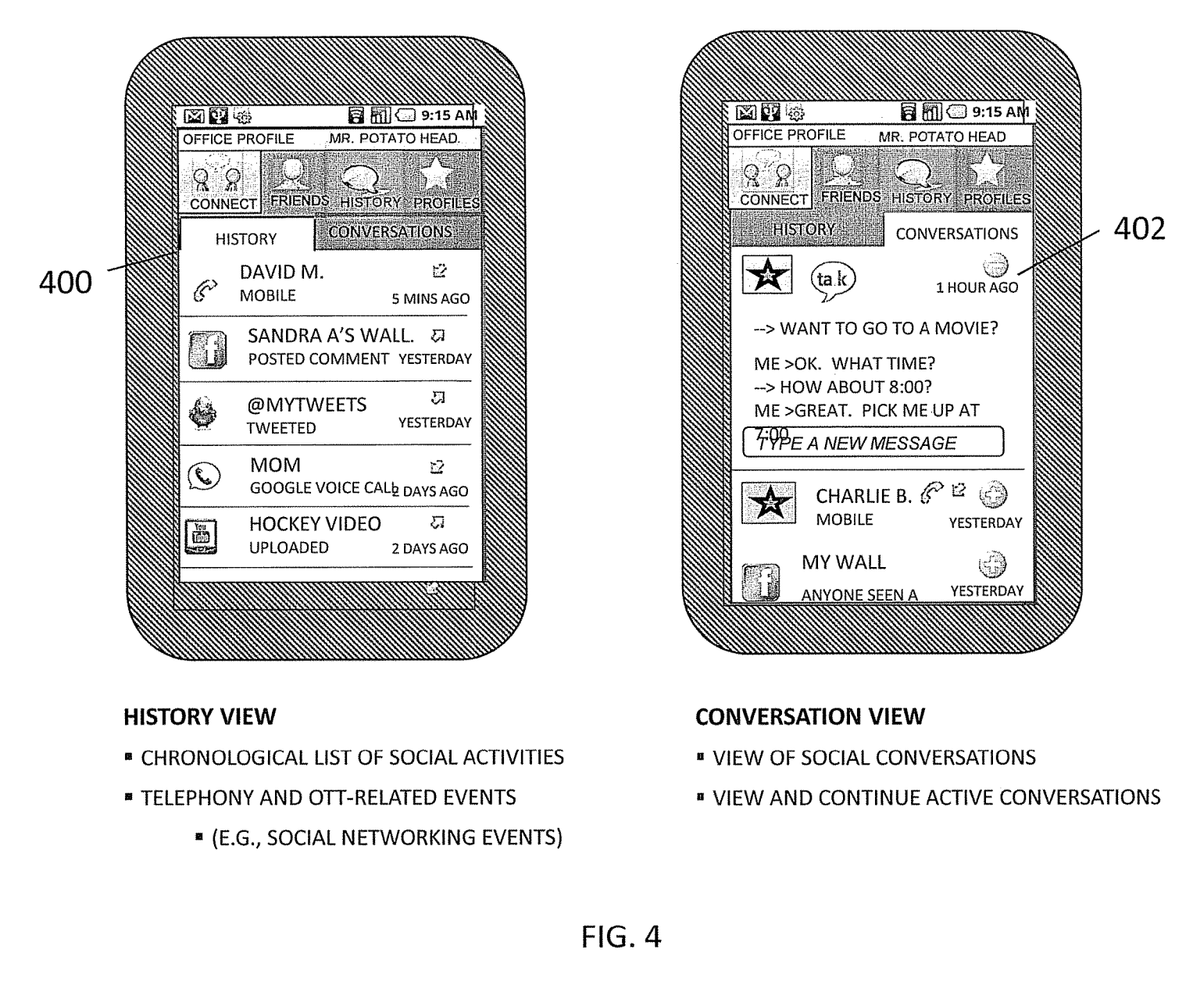
FIG. 4 is a diagram illustrating two views of displayed social interaction information according to an embodiment of the subject matter described herein.

FIG. 4 is a diagram illustrating displayed social interaction information according to an embodiment of the subject matter described herein. As stated above, social interaction information may be consolidated and stored in a data structure. The data structure may include sufficient information to allow social interaction information to be extracted and presented to the end user. In some embodiments, different social graphs or visual representations may be derived using the information or metadata stored in the data structure. For example, one or more factors may be used to present a portion of a user's complete social interaction history. For instance, users may filter or otherwise select social interaction information for display based on various factors. Exemplary factors may include a time period (e.g., interactions may be displayed that occur within the past two weeks), a persona (e.g., interactions may be displayed that occur between co-workers, friends, family, or another group), a location (e.g., interactions may be displayed that occur between people located in a particular city or state), an occupation or interest (e.g., interactions may be displayed that occur between doctors or avid readers), a communications device (e.g., interactions may be displayed that occur between people using an iPhone phone), a communications service (e.g., interactions may be displayed that are not via Twitter), a conversation (e.g., interactions may be displayed between two people via any communications services), and frequency of interaction (e.g., interactions may be displayed between people that have interact five or more times in the past week).

Depending on factors selected by users, various social graphs or views may be provided which are not available in conventional communications equipment. For example, exemplary views may include a temporal-based social graph, a true or consolidated social graph, a persona-based social graph, and conversation-based social graph. A temporal-based social graph may include social interactions and/or interaction history during a specific duration of time (e.g., during the past week). A temporal-based social graph may be usable for displaying interactions within temporary, ad hoc, or context sensitive social communities. A true or consolidated social graph may include social interactions and/or interaction history aggregated from various communications services (e.g., OTT services and telephony services). For example, a consolidated social graph may include a user's complete interaction history (e.g., as stored in a data structure). A true social graph may be usable for displaying interactions associated with a long-term or core group of friends. A persona-based social graph may include social interactions and/or interaction history corresponding to a user's different personas (e.g. personal, office, gaming, anonymous, etc.). A persona-based social graph may be usable for displaying interactions within temporary, ad hoc, or context sensitive social communities. A conversation-based social graph may include social interactions and/or interaction history associated with active conversations or communications. For example, a conversation-based social graph may include interactions spanning different social networking sites. The interactions may be arranged based on conversations or related discussions (e.g., as determined by user input and/or similar phrases in the interactions).

Social graphs may be graphical user interfaces (GUIs), or portions thereof, and, as such, may include interactive capabilities. For example, a social graph (e.g., GUI 402) may include interactions having links or pointers to corresponding communications services (e.g., Facebook, Twitter, Gmail, etc.). Using interactive social graphs, users may initiate or continue interactions across various communications services without having to directly invoke communications services (e.g., logging into each individual website and entering information via each website), thereby allowing users to interact with various communications services via a single GUI or application.

For example, a user may access an interactive social graph (e.g., GUI 402). The user may browse to a specific friend, service, or previous conversation and may initiate a new interaction or continue with a previous interaction via the social graph. For instance, the user may enter a reply to a friend's previous Facebook comment via the social graph. In response to the user entering a reply via the social graph, the social graph or an associated application (e.g., a blended communications application running on UE 102 or SIC node 110) may interact with the communications service to perform actions that correspond to the user's action via the social graph. For example, in response to a reply being enter via a social graph, SIC node 110 may establish an HTTP session with a Facebook server using stored login credentials and send a message to the Facebook server that corresponds to the message entered via the social graph.

Referring to FIG. 4, GUIs 400 and 402 include interactive social graphs. In particular, GUI 400 depicts a temporal-based social graph or history view that includes a chronological list of social interaction information, including telephony and OTT-related events. For example, as shown in FIG. 4, GUI 400 includes interaction information associated with a mobile phone call, a Facebook comment, a Twitter tweet, a Google Voice call, and a YouTube video. In this example, a user may click on an interaction entry for more detail. For instance, if the user clicks the Twitter interaction entry, a tweeted message may be displayed.

GUI 402 depicts a conversation-based social graph or conversation view that arranges interactions based on related topics. For example, as shown in FIG. 4, GUI 402 includes GUI elements ('+' and '−' icons), that if selected, may expand or contract conversation details. In the expanded conversation details, previous interactions are display along with a text box for continuing the conversation. For example, a user may enter a message into the text box. After entering the message into the text box and indicating to GUI 402 that the message is to be transmitted, GUI 402 may initiate communications with a Google Talk server such that the entered message is provided to the other participant in the Google Talk conversation. For instance, GUI 402 or another entity may initiate a XMPP message which corresponds to the entered message.

Figure 5:
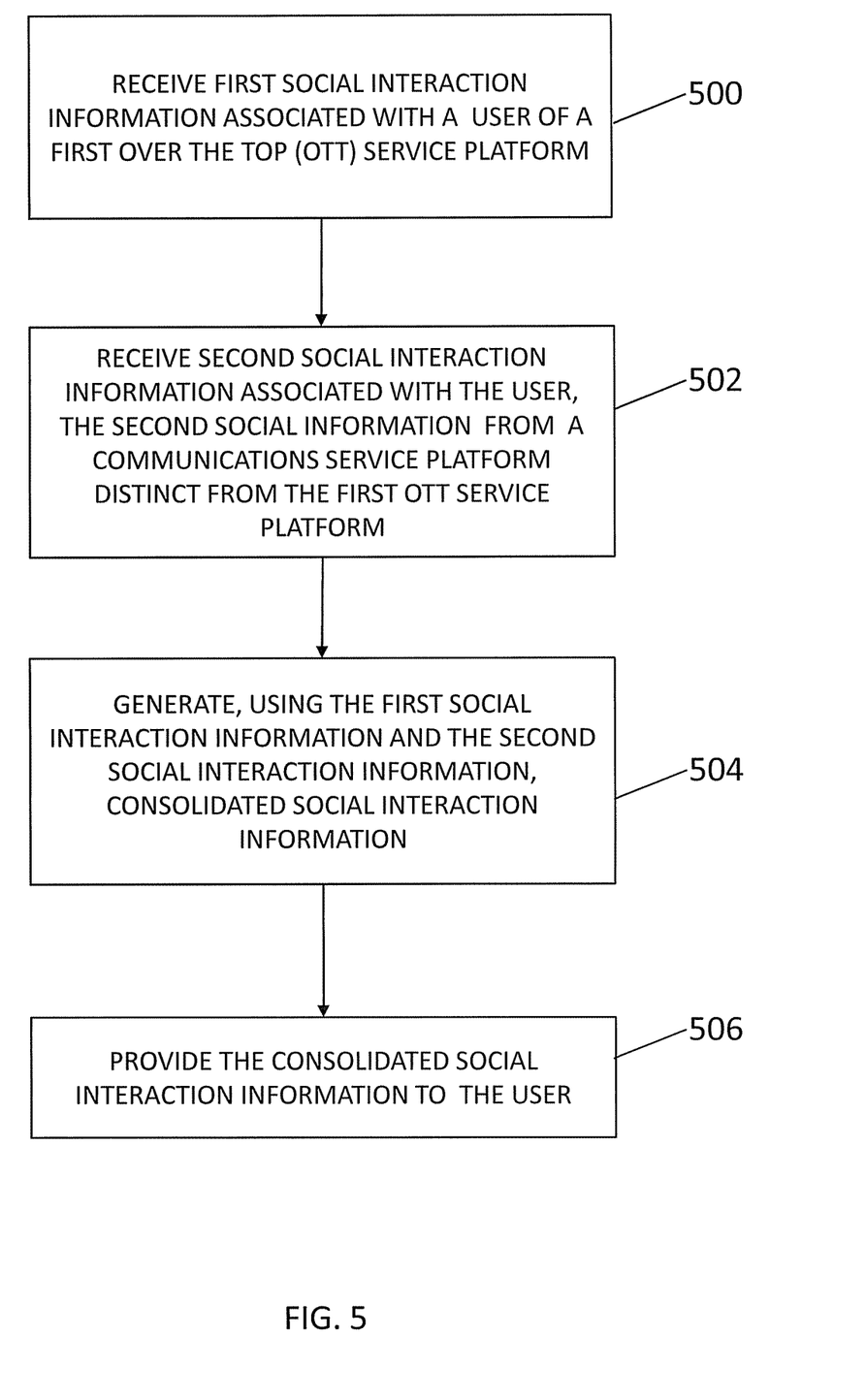
FIG. 5 is a flow chart illustrating an exemplary process for managing social interaction information according to an embodiment of the subject matter described herein.

FIG. 5 is a flow chart illustrating an exemplary process for managing social interaction information according to an embodiment of the subject matter described herein. In some embodiments, the exemplary process described herein, or portions thereof, may be performed by a consolidation module and/or a monitoring module. Referring to FIG. 5, in step 500, first social interaction information may be received. The first social interaction information may be associated with a user of a first OTT service platform. For example, consolidation module 204 may log into the first OTT service platform using stored user information and retrieve Facebook communications associated with a user's Facebook profile. In another example, the first social interaction information may include a copied portion of monitored or observed communications between UE 102 and an OTT service platform (e.g., OTT A 112).

In step 502, second social interaction information associated with the user may be received. The second social interaction information may be from a communications service that is distinct from the first OTT service platform. For example, the communications service may be a mobile telecommunications service and the second social interaction information may include conventional telephony events, such as incoming and outgoing mobile calls or text messages. In another example, the communications service may be a second OTT service platform, such as Twitter, and the second social interaction information may include recent messages or Tweets.

In step 504, consolidated social interaction information may be generated. The consolidated social interaction information may be generated using the first social interaction information and the second social interaction information. For example, consolidation module 204 may resolve identity conflicts that occur when users have different identities or profiles for different services. Various identities may be resolved via user input and/or by matching identities that have similar profile information (e.g., a same email address or phone number) into master identifies (e.g., address book contact entries associated UE 102). After resolving identity conflicts, consolidation module 204 may correlate received social interaction information (e.g., Facebook wall posts, Twitter tweets, Google Talk, SMS messages, incoming and outgoing phone calls, YouTube posts, etc.) with the master identities. Consolidation module 204 may create a data structure (e.g., an XML data file or a database) for storing consolidated social interaction information. For example, the data structure may store associations between interactions and originating communication services along with related interaction information, such as timestamps, associated user profiles, uploaded media, and other information.

In step 506, the consolidated social interaction information may be provided to the user. For example, a blended communications application running on UE 102 may allow a user to request an integrated or consolidated interaction history, or a portion thereof. Consolidation module 204 may receive the request and, in response, provide consolidated social interaction information to the user.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for managing social interaction history information, the method comprising:
    automatically logging into a first over the top (OTT) service platform, by a social interaction information consolidation module, using stored user information and retrieving first social interaction history information associated with a user of a first OTT service platform;
    receiving further first social interaction history information associated with the user of the first OTT service platform, via a monitoring module, including monitoring communications between the user and the first OTT service platform, the monitoring module being a part of, and monitoring communications between the user and the first OTT service platform is performed by, at least one of a server, a proxy, and a telecommunications node disposed in a carrier network;
    receiving second social interaction history information associated with the user, the second social interaction history information from a communications service platform distinct from the first OTT service platform;
    generating, using the first social interaction history information and the second social interaction history information, a consolidated social interaction history correlating related interactions that include at least one of similar phrases and related topics; and
    providing a the consolidated social interaction history to the user.

2. The method of claim 1 wherein providing consolidated social interaction history to a user includes generating a data structure representing the history of social interactions of the user.

3. The method of claim 2 wherein the data structure includes information indicating associations between related interactions occurring via the first OTT service platform and the communications service.

4. The method of claim 2 wherein the data structure is used in generating a visual representation of at least a portion of the history of social interactions of the user.

5. The method of claim 4 wherein the at least a portion of the social interactions of the user is based on at least one of a time period, a person, a location, an occupation, an interest, a communications device, a communications service, a conversation, and frequency of interaction.

6. The method of claim 4 wherein the visual representation is usable to initiate communications via the first OTT service platform or a second OTT service platform.

7. The method of claim 1 wherein the first OTT service platform includes one of an email service platform, an instant messaging service platform, a social networking service platform, a media hosting service platform, a business networking service platform, a media streaming service platform, or a voice over Internet Protocol (VoIP) service platform.

8. The method of claim 1 wherein the communications service platform includes one of a mobile telecommunications service platform or a second OTT service platform.

9. A system for managing social interaction information, the system comprising:
   a monitoring module processor configured to:
      receive first social interaction history information associated with a user in a first over the top (OTT) service platform; and
      receive second social interaction history information associated with the user, the second social interaction history information from a communications service platform distinct from the first OTT service platform; and
   a social interaction information consolidation module processor disposed in a carrier network and configured to:
      automatically log into the first OTT service platform using stored user information and retrieve further first social interaction history information associated with the user of the first over the top service platform;
      generate, using the first social interaction history information and the second social interaction history information, a consolidated social interaction history; and
      provide the consolidated social interaction history to the user.

10. The system of claim 9 wherein the monitoring module processor is associated with at least one of user equipment, a server, a proxy, and a telecommunications node.

11. The system of claim 9 wherein the social interaction information consolidation module processor acts as a proxy server for communications traversing the carrier network is associated with at least one of user equipment, a server, a proxy, and a telecommunications node.

12. The system of claim 9 wherein the social interaction information consolidation module-processor is configured to generate a data structure representing a history of social interactions of the user.

13. The system of claim 9 wherein the data structure includes information correlating related interactions that include at least one of similar phrases and related topics.

14. The system of claim 12 wherein the social interaction information consolidation module processor is configured to generate, using the data structure, a visual representation of at least a portion of the history of the social interactions of the user.

15. The system of claim 14 wherein the at least a portion of the social interactions of the user is based on at least one of a time period, a person, a location, an occupation, an interest, a communications device, a communications service, a conversation, and frequency of interaction.

16. The system of claim 14 wherein the visual representation is usable to initiate communications via the first OTT service platform or a second OTT service platform.

17. The system of claim 9 wherein the first OTT service platform includes one of an email service platform, an instant messaging service platform, a social networking service platform, a media hosting service platform, a business networking service platform, a media streaming service platform, or a voice over Internet Protocol (VoIP) service platform.

18. The system of claim 9 wherein the communications service platform includes one of a mobile telecommunications service platform or a second OTT service platform.

19. A method for managing social interaction history information, the method comprising:
   automatically logging into a first over the top (OTT) service platform, by a social interaction information consolidation module, using stored user information and retrieving first social interaction history information associated with a user of a first OTT service platform;
   receiving further first social interaction history information associated with the user of the first OTT service platform, via a monitoring module, including monitoring communications between the user and the first OTT service platform, the monitoring module being a part of, and monitoring communications between the user and the first OTT service platform is performed by, at least one of a server, a proxy, and a telecommunications node disposed in a carrier network;
   receiving second social interaction history information associated with the user, the second social interaction history information from a communications service platform distinct from the first OTT service platform;
   registering, by the social interaction information consolidation module, for event notifications to receive further first social interaction history information associated with the user of the first OTT service platform and/or from the communications service platform;
   generating, using the first social interaction history information and the second social interaction history information, a consolidated social interaction history correlating related interactions that include at least one of similar phrases and related topics; and
   providing a the consolidated social interaction history to the user.

* * * * *